(12) United States Patent
Farley (10) Patent No.: US 9,520,952 B2
(45) Date of Patent: Dec. 13, 2016

(54) POLARIZATION MODE DISPERSION (PMD) TOLERANT OPTICAL SIGNALING

(71) Applicant: Kevin Farley, Ottawa (CA)

(72) Inventor: Kevin Farley, Ottawa (CA)

(73) Assignee: CIENA CORPORATION, Hanover, MD (US)

( * ) Notice: Subject to any disclaimer, the term of this patent is extended or adjusted under 35 U.S.C. 154(b) by 100 days.

(21) Appl. No.: 14/607,276

(22) Filed: Jan. 28, 2015

(65) Prior Publication Data

US 2016/0218813 A1    Jul. 28, 2016

(51) Int. Cl.
*H04B 10/60* (2013.01)
*H04B 10/61* (2013.01)
*H04B 10/2569* (2013.01)

(52) U.S. Cl.
CPC ...... *H04B 10/6162* (2013.01); *H04B 10/2569* (2013.01); *H04B 10/6166* (2013.01)

(58) Field of Classification Search
CPC ...... H04L 27/2665; H04L 12/18; H04L 25/08; H04L 27/2657; H04N 21/41422; H04N 21/42607; H04N 5/455; H04N 5/4401; H04W 76/002
USPC .......................................................... 398/205
See application file for complete search history.

(56) References Cited

U.S. PATENT DOCUMENTS

| | | | |
|---|---|---|---|
| 5,473,457 A | 12/1995 | Ono | |
| 6,646,774 B1 | 11/2003 | Willner et al. | |
| 7,606,498 B1 | 10/2009 | Wu et al. | |
| 7,636,525 B1 * | 12/2009 | Bontu | H04B 10/60 398/208 |
| 7,894,728 B1 | 2/2011 | Sun et al. | |
| 8,005,368 B2 | 8/2011 | Roberts et al. | |
| 8,385,747 B2 * | 2/2013 | Roberts | H04B 10/677 398/147 |
| 2007/0092259 A1 * | 4/2007 | Bontu | H04B 10/2572 398/147 |
| 2011/0103795 A1 * | 5/2011 | Khandani | H04B 10/60 398/65 |
| 2011/0150505 A1 * | 6/2011 | Roberts | H04B 10/60 398/208 |
| 2011/0249981 A1 * | 10/2011 | Deczky | H04B 10/614 398/208 |

(Continued)

OTHER PUBLICATIONS

Petitit, Extended European Search Report for EU16153109.0, mailed Jun. 22, 2016.

(Continued)

*Primary Examiner* — Juan A Torres
(74) *Attorney, Agent, or Firm* — Integral Intellectual Property Inc.; Miriam Paton (57) ABSTRACT

A method of receiving an optical signal through an optical communication system. The optical signal is transmitted by a transmitter of the optical communication system with a predetermined State of Polarization in a succession of signalling intervals. The SoP in each signalling interval is selected to excite two orthogonal eigenvectors of Polarization Mode Dispersion (PMD) of the optical communication system. The SoP in one signalling interval may be different from the SoP in at least one other signalling interval. Modulation of the optical signal is detected in two orthogonal polarization directions. Modulation components associated with one of the two orthogonal eigenvectors are selected and used to recover data.

22 Claims, 8 Drawing Sheets

(56) References Cited

U.S. PATENT DOCUMENTS

| | | | |
|---|---|---|---|
| 2012/0063786 A1* | 3/2012 | Sun | H03L 7/0812 |
| | | | 398/152 |
| 2013/0089341 A1* | 4/2013 | Roberts | H04L 27/2271 |
| | | | 398/208 |
| 2013/0136450 A1* | 5/2013 | Roberts | H04B 10/677 |
| | | | 398/65 |
| 2013/0209089 A1* | 8/2013 | Harley | H04B 10/5561 |
| | | | 398/25 |

OTHER PUBLICATIONS

Tuft, et al., "Time Interleaved Polarization Multiplexing for Polarization Labelling", Transparent Optical Networks, 2005, Proceedings of 2005 7th International Conference Barcelona, Catlonia, Spain, Jul. 3-7, 2005, vol. 1, pp. 47-51.

* cited by examiner

POLARIZATION MODE DISPERSION (PMD) TOLERANT OPTICAL SIGNALING

CROSS-REFERENCE TO RELATED APPLICATIONS

This is the first application filed in respect of the present invention.

FIELD OF THE INVENTION

The present application relates generally to optical communications networks, and more specifically to polarization mode dispersion (PMD) tolerant optical signaling in an optical communications network.

BACKGROUND

Figure 1:
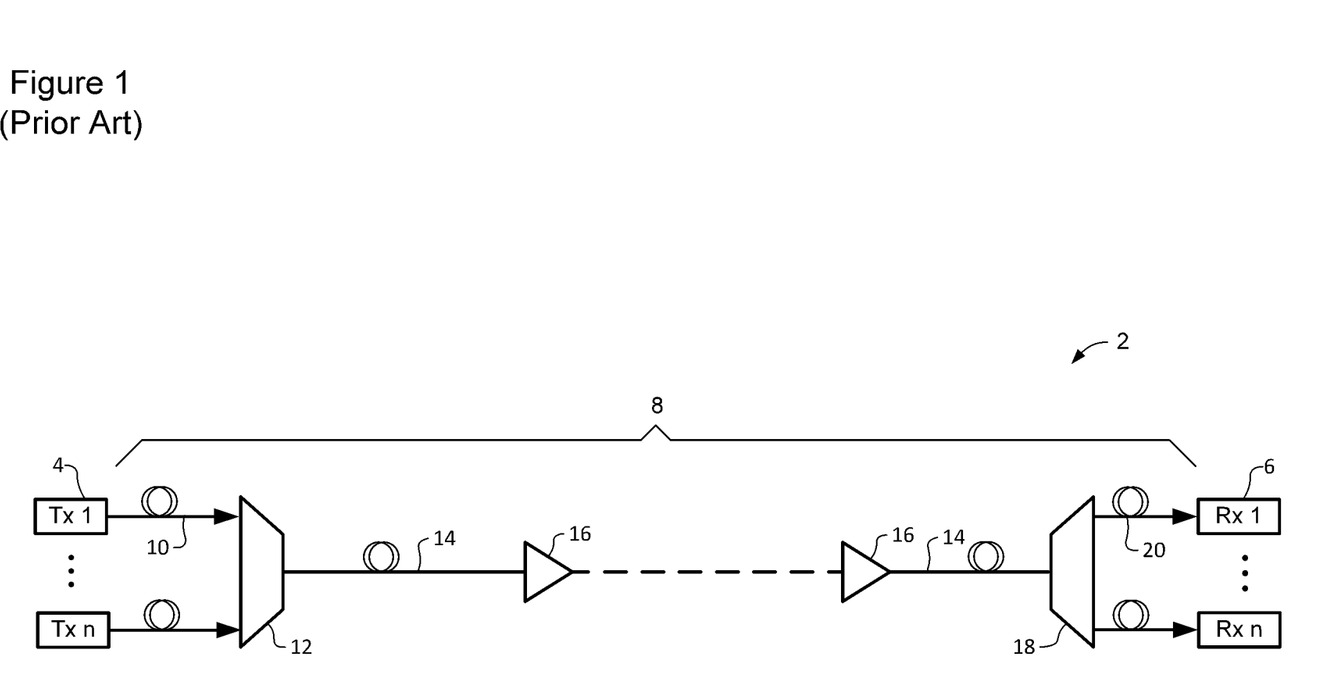
FIG. 1 is a block diagram schematically illustrating a representative optical communications system of a type in which the present invention may be used.

FIG. 1 illustrates a representative Wavelength Division Multiplexed (WDM) or Dense Wavelength Division Multiplexed (DWDM) optical system 2 known in the art. As may be seen in FIG. 1, the system 2 comprises a set of transmitters 4 and a set of receivers 6 interconnected by an optical link 8, which in this illustration is taken to encompass the entire optical path between the transmitters 4 and the receivers 6. Thus the link 8 includes optical fiber patch-cords 10 between each Tx 4 and a MUX 12 which operates to combine optical signals from each of the TXs 4 to generate a WDM or DWDM signal, which is then transmitted through a plurality of fiber spans 14 interconnected by discrete optical devices 16 to a receiver end of the link 8. At the receiver end, a DEMUX 18 separates individual wavelength channels from the inbound WDM or DWDM signal, and supplies each separated wavelength channel to a respective receiver 6 via an optical patch-cord 20.

Typically, each optical component within the link 8 has at least some degree of birefringence. Consequently, the link 8 as a whole also exhibits a link birefringence that is the combined effect of the respective component birefringence of each optical component making up the optical link 8. As is known in the art, the birefringence of some components can vary in time at rates of up to 20 kHz or more. This time varying birefringence can be detected in a receiver 6 as a rapidly time varying Polarization Mode Dispersion (PMD).

Methods are known for compensating PMD in a receiver 6 by coherent detection of the channel signal and post-processing in a high speed Digital Signal Processor. However, in some cases, a lower cost solution would be desirable, even at a cost of somewhat reduced performance.

SUMMARY

An aspect of the present invention provides a PMD tolerant optical signalling method and system.

Thus aspects of the present invention provide a method of receiving an optical signal through an optical communication system. The optical signal is transmitted by a transmitter of the optical communication system with a predetermined State of Polarization in a succession of signalling intervals. The SoP in each signalling interval is selected to excite two orthogonal eigenvectors of Polarization Mode Dispersion (PMD) of the optical communication system. The SoP in one signalling interval is different from the SoP in at least one other signalling interval. Modulation of the optical signal is detected in two orthogonal polarization directions. Modulation components associated with one of the two orthogonal eigenvectors are selected and used to recover data.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

For the purposes of the present technique, it is useful to consider an optical signal as being decomposed into a continuous series of signalling intervals. In a simple conception, a signalling interval may correspond with a modulated symbol (or baud) period. In other embodiments, a signalling interval may correspond with a sample period of the transmitter. In general, a signalling interval is a period of time in which the transmitter is capable of generating an optical signal with a desired State of Polarization (SoP).

Polarisation mode dispersion (PMD) to first order is a differential group delay (DGD) between two orthogonal polarisations. Due to the birefringence of the link 8, the DGD can be modeled as a pair of orthogonal Eigenvectors corresponding to the principal axes of the birefringence of the link, and respective Eigenvalues indicative of the magnitude of the DGD.

In one aspect, the present technique provides a signalling system in which a signal is transmitted in a continuous series of signalling intervals. The signal transmitter operates such that, during each signalling interval the transmitted signal, the transmitted State of Polarization (SOP) of the signal is controlled to excite both Eigenvectors of the DGD. However, the SOP of the signal, averaged over a large number of signalling intervals, may be depolarized. At a receiver end of the link, the inbound signal is sampled and processed to compensate slow-changing impairments, such as chromatic dispersion. The resulting compensated sample stream is then processed to track the Eigenvectors of DGD. Samples most closely aligned with the Eigenvector yielding the best signal metrics are then selected for further processing to recover transmitted data. The remaining samples may be discarded.

As noted above, in broad terms, the signalling interval is a period of time in which the transmitter is configured to transmit an optical signal with a selected state of polarization. For ease of construction, it may be convenient to select the signalling interval to correspond with the sample period of the transmitter (or, equivalently, a digital-to-analog converter of the transmitter), but this is not essential. For example, in some embodiments, the signalling interval may correspond with a symbol (baud) period of the optical signal, which may span one or more sample periods.

Figure 2A:
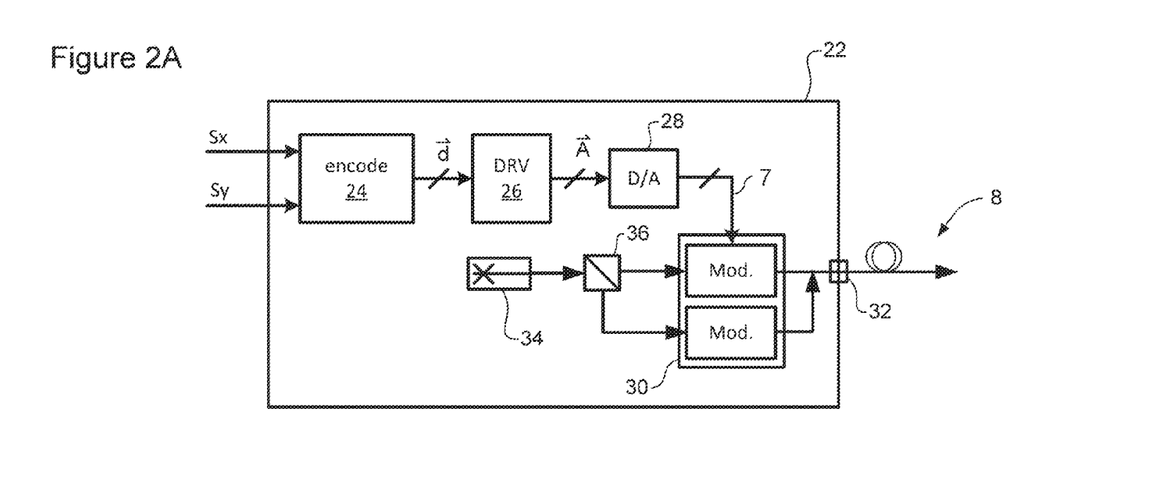
FIGS. 2A and 2B are block diagrams schematically illustrating representative transmitters usable in the optical communications system of FIG. 1.

FIG. 2A schematically illustrates a transmitter 22 that is usable in the present technique. In the transmitter of FIG. 2A, the transmitter 22 generally comprises an encoder 24, a driver 26, a Digital-to-Analog (D/A) converter 28 and a dual-polarization modulator 30. The encoder 24 is configured to encode a pair of digital data signals (Sx and Sy) using a suitable encoding scheme (such as, for example, Quadrature Phase Shift Keying, QPSK, or n-Quadrature Amplitude Modulation, n-QAM) to generate complex valued symbols $\vec{d}$. The driver circuit 26 then processes the symbols $\vec{d}$ to generate digital drive signals $\vec{A}$ that are designed to drive the dual-polarization modulator 30 to produce a desired e-field envelope of the modulated optical signal emitted at the output 32 of the transmitter 22. The digital drive signals $\vec{A}$ are converted into respective analog drive signals 7 by the Digital-to-Analog (D/A) converter 28 and modulated onto two dimensions (e.g. phase and amplitude, or In-phase (I) and Quadrature (Q)) of each of two orthogonal polarizations of a continuous wave (CW) optical carrier light. The CW carrier light is typically generated by a laser 34 in a manner known in the art, and the dual-polarization modulator 30 may be implemented using a polarization beam splitter 36 and any suitable modulator devices, such as phase modulators, variable optical attenuators, Mach-Zender interferometers, etc. The modulated optical signal appearing at the output 32 of the transmitter 22 may then be transmitted through the optical fiber link 8.

With this arrangement, the driver circuit 26 can operate to generate digital drive signals $\vec{A}$ designed to produce a modulated optical signal with any desired State of Polarization (SOP). For example, the transmitter of FIG. 2A is capable of generating a polarization multiplexed optical signal comprising two linearly polarized signals having respective polarization axes oriented orthogonally to each other. Alternatively, the transmitter of FIG. 2A may be controlled to generate a polarization interleaved optical signal in which the optical signal comprises two linearly polarized signals having respective polarization axes oriented orthogonally to each other, and in which successive symbols are modulated onto each of the orthogonal linearly polarized signals in an alternating (or other) pattern. In a still further alternative, the transmitter may be controlled to generate a linearly polarized signal having its principal axis of polarization oriented at a desired angle. Other SoPs are also possible, as is known to those of ordinary skill in the art.

Figure 2B:
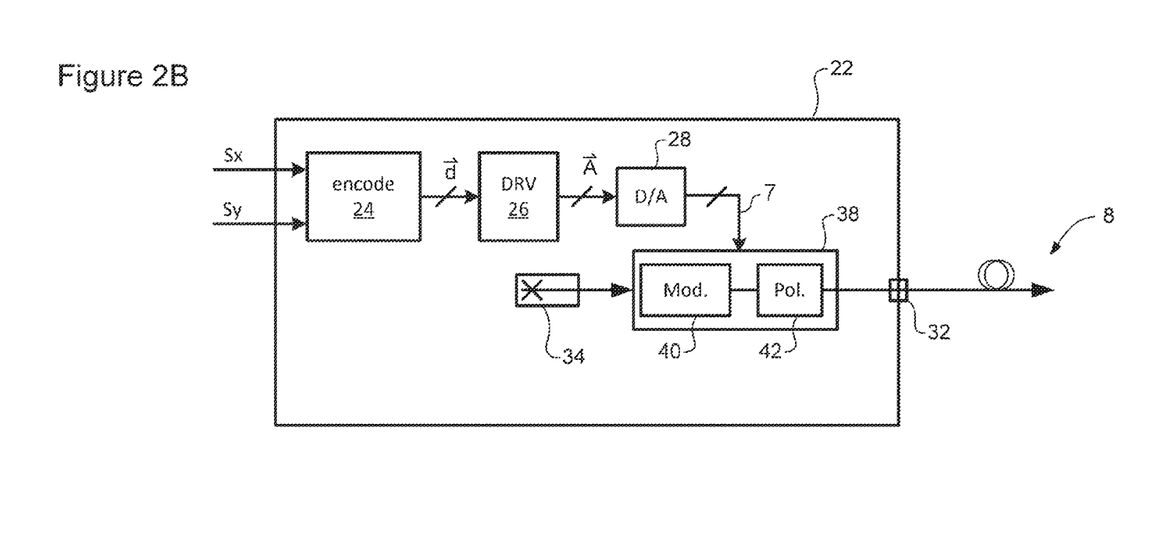

FIG. 2B illustrates an alternative transmitter, which operates in a manner similar to the transmitter of FIG. 2A, except that the dual polarization modulator 30 (FIG. 2A) is replaced by a linear polarization modulator 38 comprising a modulation block 40 and a polarization rotator 42. The modulation block 40 may operate in a conventional manner to modulate the amplitude and/or phase of the CW carrier light from the laser 34, and the polarization rotator 42 is used to control an orientation of the principal axes of the modulated optical signal output from the modulation block 40. In this case, the driver circuit 26 may be configured to generate digital drive signals $\vec{A}$ that are designed to drive both the modulation block 40 and the polarization rotator 42. As may be appreciated, the transmitter of FIG. 2B is configured to generate a polarized signal having its principal axis of polarization oriented at a desired angle. The orientation of the principal axis of polarization may be changed as desired, within the capabilities of the polarization rotator 42. For example, the polarization rotator 42 can be controlled to change the orientation of the principal axis of polarization by ±90 degrees in a step-wise manner in every symbol (baud) interval, to yield a polarization multiplexed signal.

Figure 3:
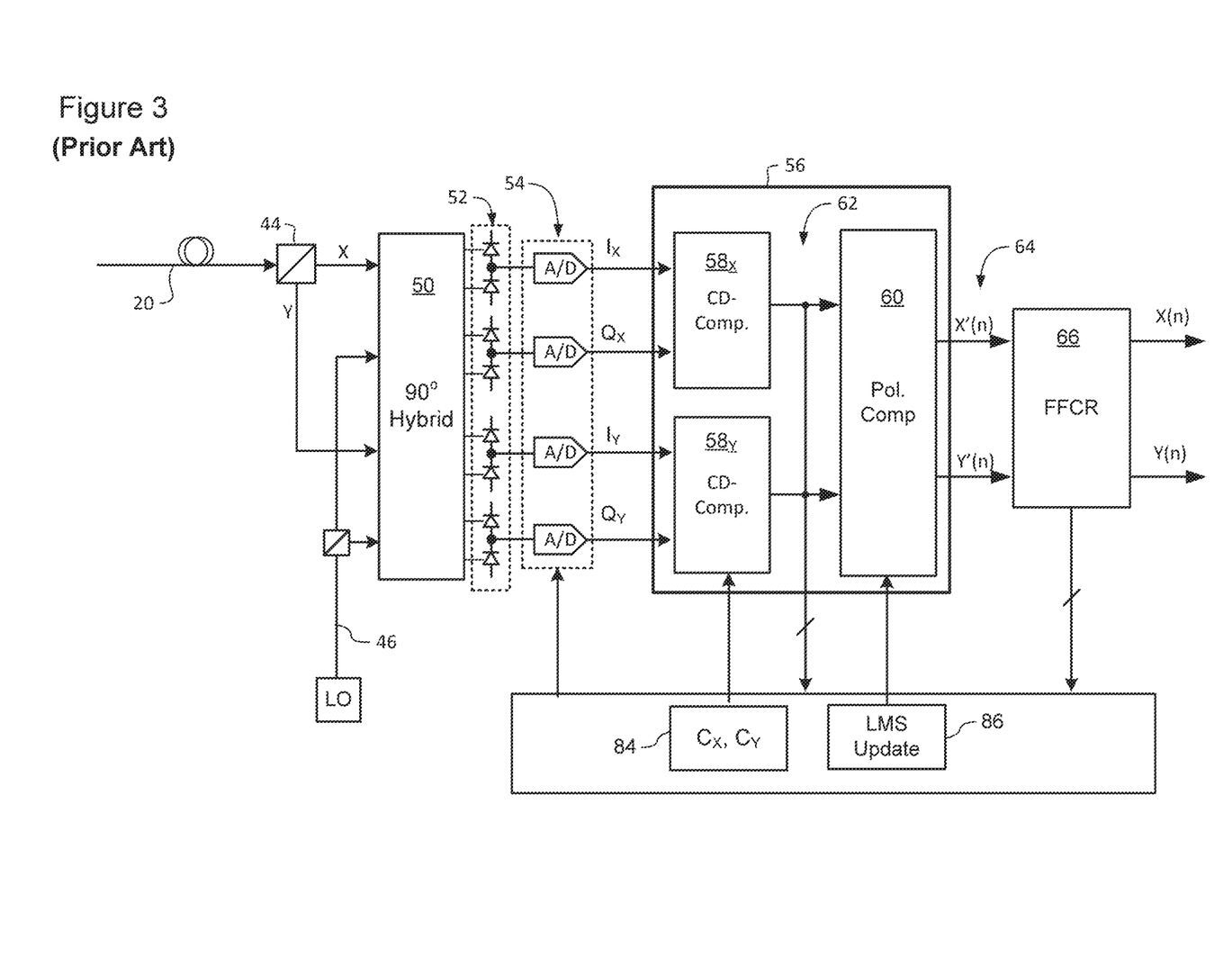
FIG. 3 is a block diagram schematically illustrating principal elements and operations of a coherent optical receiver that tracks both eigenvectors and eigenvalues of an inbound optical signal.

FIG. 3 schematically illustrates principal elements and operations of a receiver 6 known, for example, from U.S. Pat. No. 8,005,368, which issued on Aug. 23, 2011. As may be seen in FIG. 3, an inbound optical signal is received through the optical link 8 (ie. through patch-cord 20 from Demux 18), split into orthogonal received polarizations (denoted as X and Y) by a Polarization Beam Splitter 44, and then mixed with a Local Oscillator (LO) signal 46 by a conventional 90° optical hybrid 50. The composite optical signals emerging from the optical hybrid 50 are supplied to respective photodetectors 52, which generate corresponding analog electrical signals. The photodetector signals are sampled by respective Analog-to-Digital (A/D) converters 54 to yield raw multi-bit digital signals $I_X$, $Q_X$ and $I_Y$, $Q_Y$ corresponding to In-phase (I) and Quadrature (Q) components of each of the received X and Y polarizations.

From the A/D converter block 54, the raw multi-bit signals $I_X$, $Q_X$ and $I_Y$, $Q_Y$ are supplied to an equalizer 56 which includes respective dispersion compensators 58 for each of the X- and Y-polarization sample streams, and a polarization compensator 60. If desired, timing control methods described in Applicant's U.S. Pat. No. 7,894,728, which issued to patent on Feb. 22, 2011, including the use of elastic stores (not shown in FIG. 3) between the A/D converters 54 and the dispersion compensators 58 may be used to ensure at least coarse phase alignment between samples at the equalizer input. In general, the dispersion compensators 58 operate to compensate chromatic dispersion impairments of the received optical signal. The dispersion-compensated digital signals 62 appearing at the output of the dispersion compensators 58 are then supplied to the polarization compensator 60 which operates to compensate polarization effects, and thereby de-convolve transmitted symbols from the complex signals 62 output from the dispersion compensators 58. The output of the polarization compensator 60 is a pair of multi-bit estimates 64 X'(n) and Y'(n) of the symbols encoded on each transmitted polarization of the optical signal by the transmitter. The symbol estimates 64 are then supplied to a carrier recovery block 66 for LO frequency control, symbol detection and data recovery, such as described in Applicant's U.S. Pat. No. 7,606,498 issued Oct. 20, 2009.

Figure 4:
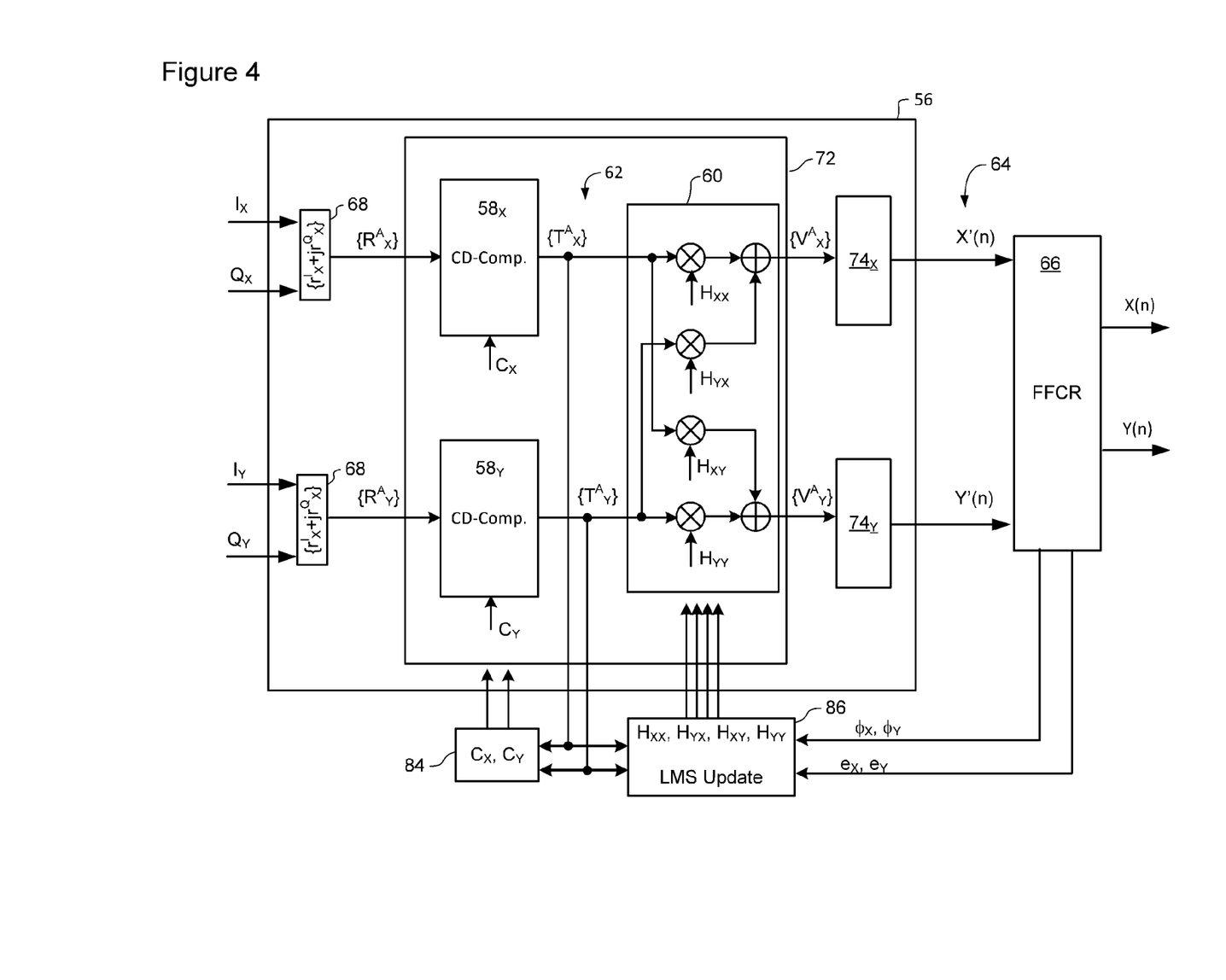
FIG. 4 is a block diagram schematically illustrating principal elements and operations of the equalizer of FIG. 3 in greater detail.

FIG. 4 schematically illustrates principal elements and operation of the equalizer 56 in greater detail. In the embodiment of FIG. 4, the dispersion compensator 58 and polarization compensator 60 are disposed within a pipelined series of functional blocks, including a deserializer 68, a signal processor (FDP) 72 and a serializer block 74.

The deserializer 68 operates to accumulate successive n-bit words of the In-phase and Quadrature digital signals $I_X$ and $Q_X$ from the X-polarization A/D converters $54_{IX}$ and $54_{QX}$, and $I_Y$ and $Q_Y$ from the Y-polarization A/D converters $54_{IY}$ and $54_{QY}$ during a predetermined clock period. The accumulated n-bit words are then latched into the signal processor 72 as a parallel input vector $\{r_{IX}+jr_{QX}\}$ for the X polarization and $\{r_{IY}+jr_{QY}\}$ for the Y polarization. In some embodiments, the signal processor 72 may be configured to process the input vectors $\{r_{IX}+jr_{QX}\}$ and $\{r_{IY}+jr_{QY}\}$ in the frequency domain, in which case a suitable Fast Fourier Transform (FFT) block may be provided between the deserializer 68 and dispersion compensators $58_X$ and $58_Y$.

The signal processor 72 can implement any of a variety of processing functions, as will be described in greater detail below, to yield modified arrays $\{V_X^A\}$ and $\{V_Y^A\}$, which are supplied to respective serializer blocks 74.

The serializer blocks 74 receive the modified arrays $\{V_X^A\}$ and $\{V_Y^A\}$, and operate to generate the equalizer output 64 in the form of complex valued vectors $\{v_{IX}+jv_{QX}\}$ and $\{v_{IY}+jv_{QY}\}$, each of which encompasses a plurality of complex valued symbol estimates X'(n) and Y'(n). In some embodiments, each of the vectors $\{v_{IX}+jv_{QX}\}$ and $\{v_{IY}+jv_{QY}\}$, encompasses m=128 complex valued symbol estimates X'(n) and Y'(n).

As noted above, in some embodiments, the signal processor 72 may be configured to operate in the frequency domain. In such cases, respective Inverse Fast Fourier Transform (IFFT) blocks may be provided between the polarization compensator 60 and each of the serializers 74, so as to generate time-domain output vectors $\{v_{IX}+jv_{QX}\}$ and $\{v_{IY}+jv_{QY}\}$ based on the frequency-domain modified arrays $\{V_X^A\}$ and $\{V_Y^A\}$.

In the embodiment of FIG. 4, the signal processor 72 comprises the dispersion compensators 58 and the polarization compensator 60. The dispersion compensators 58 operates to multiply input arrays $\{R_X^A\}$ and $\{R_Y^A\}$ (e.g. from the deserializers 68 with a respective compensation vector $\{C_X\}$ and $\{C_Y\}$, to yield intermediate arrays $\{T_X^A\}$ and $\{T_Y^A\}$ which are supplied to the polarization compensator 60. The compensation vectors $\{C_X\}$ and $\{C_Y\}$ can be computed, for example, using a Least Mean Squares (LMS) loop 84 based on residual errors in the intermediate arrays $\{T_X^A\}$ and $\{T_Y^A\}$.

As noted above, the polarization compensator 60 is provided as a cross-compensation block which applies X-polarization vectors $H_{XX}$, $H_{XY}$ to the X-polarization intermediate array $\{T^A_X\}$, and Y-polarization vectors $H_{YY}$, $H_{YX}$ to the Y-polarization intermediate array $\{T^A_Y\}$. The multiplication results are then added together to generate the modified vectors $\{V^A_X\}$ and $\{V^A_Y\}$, as may be seen in FIG. 4. At a minimum, the X- and Y-polarization vectors $H_{XX}$, $H_{XY}$, $H_{YY}$ and $H_{YX}$ impose a phase rotation which compensates polarization impairments of the optical signal, and so de-convolve the transmitted symbols from the raw digital sample streams $I_X$, $Q_X$, and $I_Y$, $Q_Y$ generated by the A/D converters 54. Those of ordinary skill in the art will recognise that the illustrated cross-compensation block 60 implements an inverse-Jones matrix transfer function, which compensates the polarization effects. In this formulation, the vectors $H_{XX}$, $H_{XY}$, $H_{YY}$ and $H_{YX}$ are provided as the coefficients of the inverse-Jones matrix. The width of the inverse-Jones matrix is equal to that of the intermediate arrays $\{T^A_X\}$ and $\{T^A_Y\}$, and so is based on the expected maximum dispersion of the received optical signal to be compensated by the equalizer 56.

As may be appreciated, the X- and Y-polarization vectors $H_{XX}$, $H_{XY}$, $H_{YY}$ and $H_{YX}$ are preferably computed at sufficient speed to enable tracking, and thus compensation, of high-speed polarization rotation transients. In U.S. Pat. No. 8,005,368, this may be accomplished using a Least Mean Squares (LMS) update loop 86 illustrated in FIG. 4.

However, in some cases, LMS update loop 86 of the type described in U.S. Pat. No. 8,005,368 may not be able to operate fast enough to fully compensate polarization impairments such as PMD. This may be particularly challenging as line (baud) rates exceed 400 Gbaud/s. In other cases, a lower performance (i.e. baud rate) may be acceptable, but it is desired to avoid the cost and complexity associated with the LMS update loops as described in U.S. Pat. No. 8,005,368.

The present technique is based on the recognition that when a polarized transmitted signal excites both eigenvectors of the link, the receiver will first detect the signal on the eigenvector corresponding to the principal axis of the link, and then a time-delayed version of the same signal on the other eigenvector. This is similar to multi-path interference known from radio-frequency (RF) communications, but differs from RF multi-path interference in that it is a function of birefringence in the optical link rather than multiple different propagation paths. In accordance with the present technique, this observation is exploited by controlling the transmitter 22 (FIGS. 2A and 2B) to transmit a polarized optical signal having a State of Polarization (SoP) selected to excite both eigenvectors of the link. At the receiver, the eigenvector having the best signal is detected and used for recovering received data. The other eigenvector, which contains a time delayed (or advanced) copy of the optical signal on the selected eigenvector, may be discarded.

Figure 5:
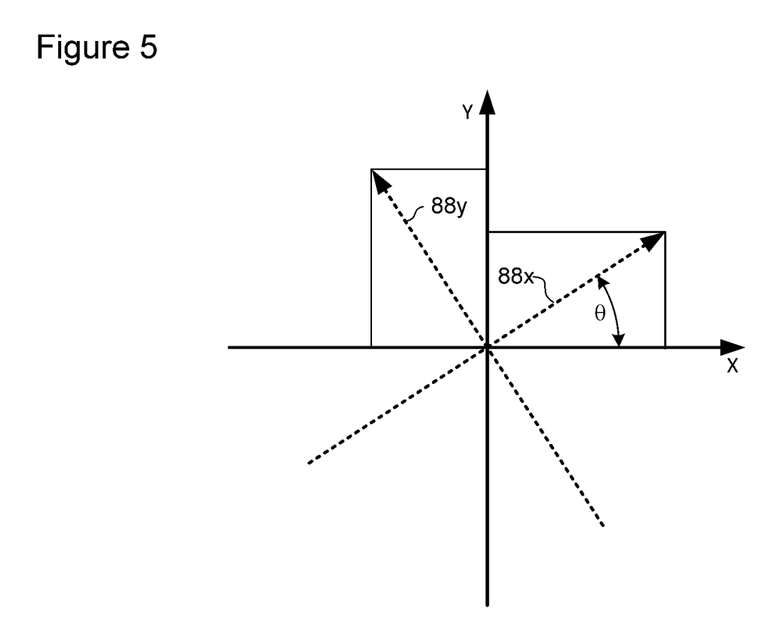
FIG. 5 is a chart illustrating relationships between detected polarization directions and principal axes of birefringence in the optical communications system of FIG. 1.

As may be appreciated, the total symbol (baud) rate of the communications system achieved in the present technique is reduced relative to the system of U.S. Pat. No. 8,005,368, for example, because data is modulated on only a single polarization during any given signaling interval. However, instead of tracking and compensating both the eigenvectors and eigenvalues of the PMD DGD, as in U.S. Pat. No. 8,005,368, the present technique only attempts to track the eigenvectors. This leads to a dramatic simplification of the polarization compensator 60 and LMS update loop 86 of the receiver shown in FIG. 4. For example, FIG. 5 illustrates the X- and Y-polarization directions separated by the polarization beam splitter 44 and detected by the photodetectors 52, and depicts the principal axes 88 of birefringence of the link 8 (corresponding with the eigenvectors) oriented at an angle θ with respect to the detected X- and Y-polarization directions. As may be seen in FIG. 5, the modulation power of the detected X- and Y-polarizations can be considered to be a sinusoidal projection of the modulation power of the link eigenvectors (corresponding to the principal axes 88 of the link birefringence). For the case in which the transmitted signal is linearly polarized, an estimate of the angle θ may be found using the detected X- and Y-polarization modulation powers and simple trigonometric relationships. For example, in FIG. 5, the angle θ may be found as $$\theta = \tan^{-1}\left(\frac{M_Y}{M_X}\right),$$

where $M_X$ and $M_Y$ are the modulation powers of the detected X- and Y-polarizations, respectively.

By changing the SoP (e.g. the orientation of the polarized light principle axis) of the transmitted signal at regular intervals, the transmitted signal becomes increasingly depolarised as the number of signalling intervals increases, and the angular error in the calculated value of θ will tend to average to zero. In some embodiments, the SoP may be changed in each successive signalling interval. In other embodiments, the SoP may remain constant for a predetermined period of time (or, equivalently, number of signalling intervals) before changing. In some embodiments, the SoP is changed such that the optical signal is substantially depolarized over a period of more than about two signalling intervals.

In some embodiments, the optical signal transmitted by the transmitter 22 may include periodic SYNC bursts having a known symbol sequence. In such cases, the angle θ may be calculated using only the periodic SYNC bursts, which may avoid errors due to erroneous symbol estimates X'(n), Y'(n) and corresponding decision values X (n), Y (n) for data symbols transmitted between the periodic SYNC bursts.

As may be appreciated, once the angle θ has been calculated, it can be used in combination with the modulation power(s) detected by the photodetectors 52 to estimate the respective modulation power of each eigenvector, again using simple trigonometric relationships, as illustrated in FIG. 5. For example, in FIG. 5, the modulation power of the principal eigenvector may be found as $M_{PE}=M_X \cos^{-1}(\theta)$, where $M_{PE}$ is the modulation power of the principal eigenvector. This operation may be conceived as a polarization rotation function, in which the orientation of the detected X- and Y polarizations is rotated to align with the eigenvectors of the link 8.

In some embodiments, periodic SYNC bursts within the received optical signal are used to calculate the angle of orientation θ of the eigenvectors, relative to the detected X- and Y-polarization directions. The calculated angle θ is then used to estimate the modulation power of each of the eigenvectors for subsequently received data symbols. With this arrangement, the angle of orientation θ of the eigenvectors can be updated at a rate equal to the frequency of the periodic SYNC bursts.

In some embodiments, the angle of orientation θ of the eigenvectors are calculated using both the periodic SYNC bursts and data symbols modulated onto the optical signal between successive SYNC bursts. This arrangement enables the angle θ to be updated much more rapidly than is possible when using the SYNC bursts alone, and any error in the angle θ that accumulates while processing data symbols can be corrected upon processing the next SYNC burst.

Figure 6:
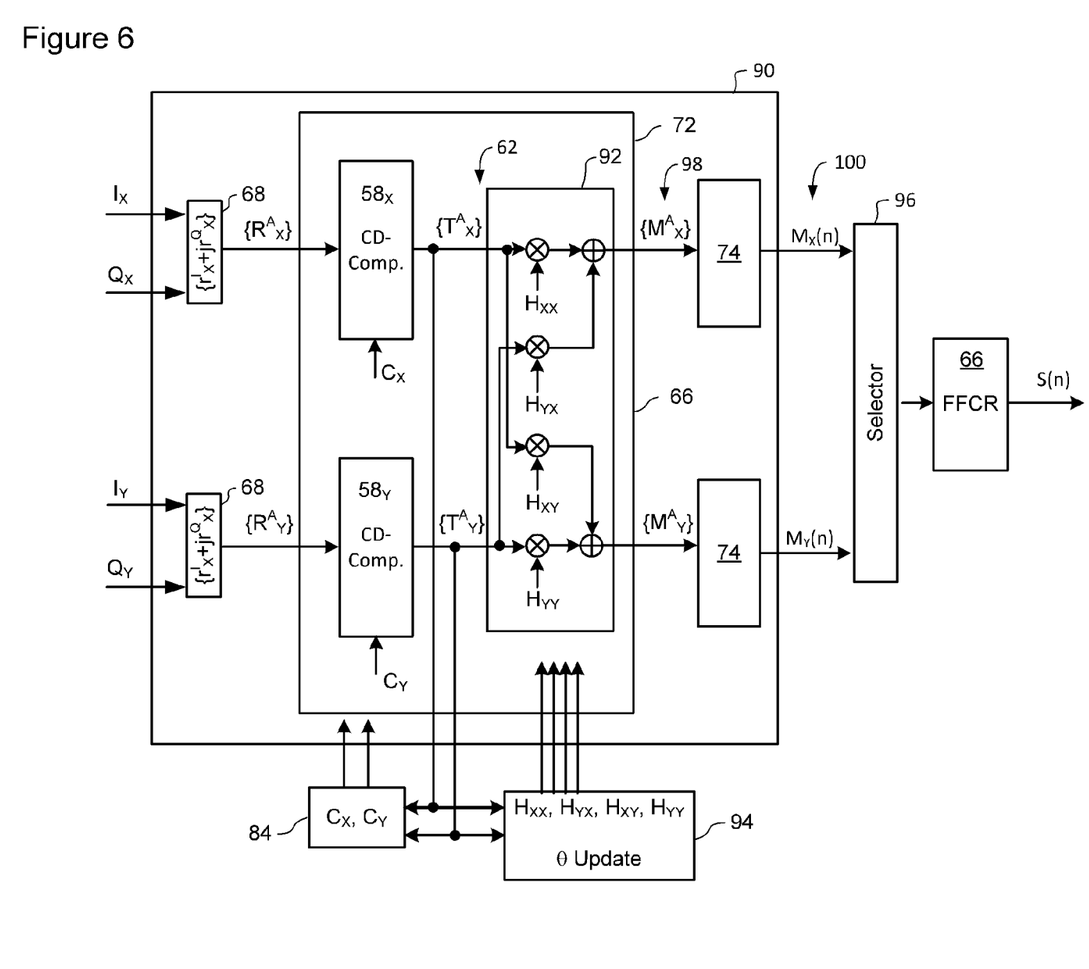
FIG. 6 is a block diagram schematically illustrating principal elements and operations of an equalizer in accordance with a representative embodiment of the present technique.

FIG. 6 illustrates principal elements and operations of a signal equalizer 90 in accordance with a first representative embodiment of the present technique. The equalizer 90 follows the general architecture of the equalizer 56 of FIG. 4, except that the polarization compensator 60 and LMS update loop 86 of FIG. 4 are replaced by a polarization rotator 92 and eigenvector updater 94, respectively. In addition, a selector 96 is inserted between the equalizer 90 and the carrier recovery block 66.

Referring to FIG. 6, the deserializers 68, and dispersion compensators 58 may operate in the same manner as described above with respect to FIG. 4, and so will not be described again. The intermediate arrays $\{T^A_X\}$ and $\{T^A_Y\}$ output from the dispersion compensators 58 represent the modulation power of each of the detected X- and Y-polarization signals. The polarization rotator 92 operates to translate the intermediate arrays $\{T^A_X\}$ and $\{T^A_Y\}$ into modified arrays $\{M^A_X\}$ and $\{M^A_Y\}$ 98, which represent the corresponding modulation powers of the link eigenvectors 88 (FIG. 5). The serializer blocks 74 operate in a manner largely described above, but in his case, the output 100 of the equalizer 90 comprises a pair of sample streams $M_X(n)$ and $M_Y(n)$ which represent the modulation power of each of the link eigenvectors 88. The selector 96 then operates to select one of the two sample streams $M_X(n)$ and $M_Y(n)$, and passes the selected sample stream to the carrier recovery block 66 for carrier recovery, LO control, and data detection in a known manner.

The selector 96 may use any suitable criteria to select one of the two sample streams $M_X(n)$ and $M_Y(n)$. In some embodiments, the selection is based on a quality metric of the two signals. For example, a respective bit error rate (BER) or signal to noise ratio (SNR) of each of the two sample streams may be used to select a best one of the two streams. Other metrics may be used, as will be apparent to those of ordinary skill in the art. Typically, the selected sample stream will correspond with the principal axis of birefringence of the link.

As noted above, the selected sample streams is supplied to the carrier recovery block 66 for carrier recovery, LO control, and data detection in a conventional manner. For the reduced case where the transmitter 22 transmits a linearly polarized signal that excites both eigenvectors, the other (nonselected) sample stream will typically comprise a time-delayed or advanced version of the symbols encoded in the selected sample stream. Accordingly, the nonselected sample stream may be discarded, or used for any other purpose, as desired.

Figure 7:
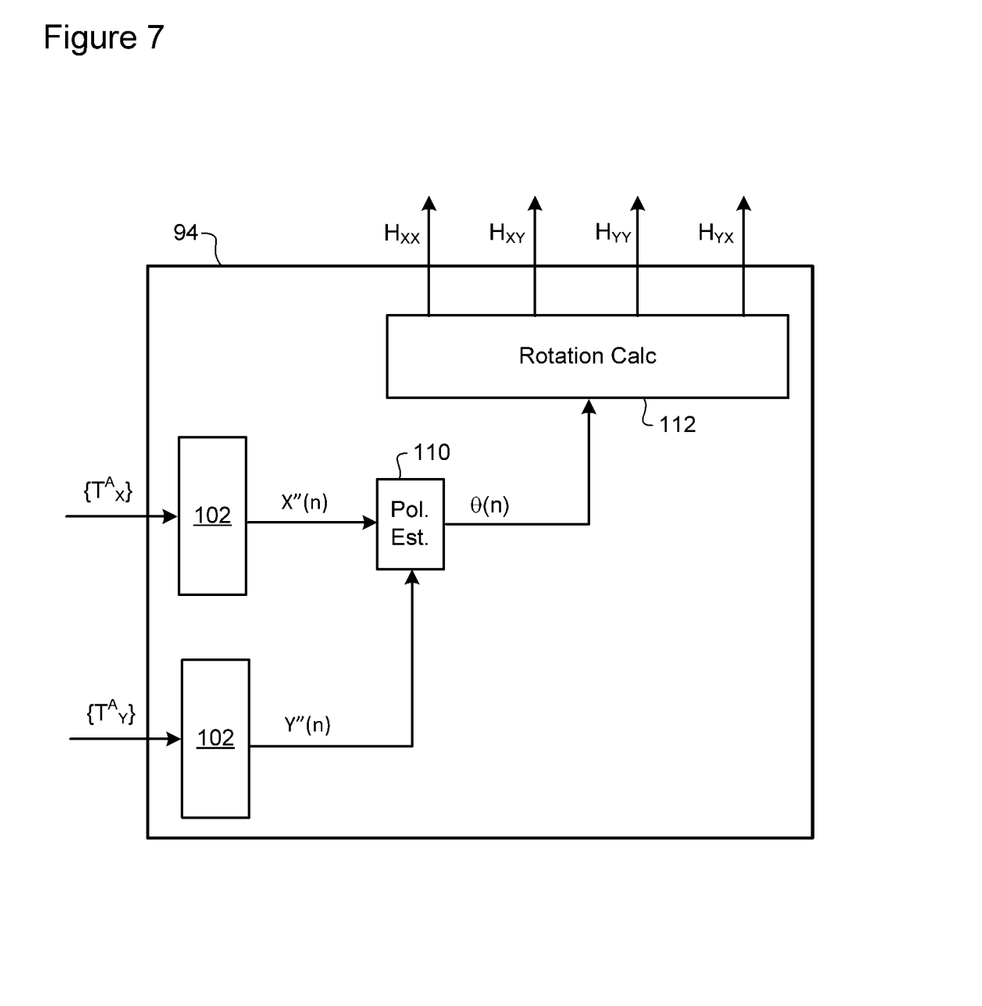
FIG. 7 is a block diagram schematically illustrating principal elements and operations of polarization angle update loop usable in the equalizer of FIG. 6.

In the illustrated embodiment, the rotator 92 operates to rotate the polarization angle of the intermediate arrays $\{T^A_X\}$ and $\{T^A_Y\}$ to the link eigenvectors. This may be accomplished using a 2×2 Jones rotation similar to that implemented by the cross-compensation block 60 described above with reference to FIG. 4, based on X- and Y-polarization vectors $H_{XX}$, $H_{XY}$, $H_{YY}$ and $H_{YX}$ calculated by the eigenvector updater 94. An important difference between the arrangement of FIG. 6 and that of FIG. 4, is that in the embodiment of FIG. 6, the X- and Y-polarization vectors $H_{XX}$, $H_{XY}$, $H_{YY}$ and $H_{YX}$ have a width of only one tap. This represents a significant reduction of hardware complexity in both the rotator 92 and the eigenvector updater 94, relative to the cross-compensation block 60 and LMS update block 86 illustrated in FIG. 4. FIG. 7 illustrates a representative embodiment of an eigenvector updater 94 usable for this purpose.

In the example of FIG. 7, the eigenvector updater 94 comprises a respective serializer block 102 for converting each of the intermediate arrays $\{T^A_X\}$ and $\{T^A_Y\}$ into time domain sample streams X"(n) and Y"(n) representing the dispersion-compensated modulation of each of the detected X- and Y-polarization signals. These signals are then provided to a polarization estimator 110, which operates as described above to calculate an estimate of the angle θ between the detected X- and Y-polarization directions and the principal axes of birefringence of the link, which correspond with the link eigenvectors. A rotation calculator 112 then calculates the set of polarization coefficients for translating the detected polarization modulation powers into corresponding modulation power of the eigenvectors.

As noted above, in some embodiments, the signal processor 72 may be configured to operate in the frequency domain. In such cases, respective Inverse Fast Fourier Transform (IFFT) blocks may be provided between the each of the serializers 102 and the polarization estimator 110, so as to generate time-domain sample streams X"(n) and Y"(n) based on the frequency-domain intermediate arrays $\{T^A_X\}$ and $\{T^A_Y\}$. Respective FTT blocks may also be used to convert the time domain polarization coefficients output from the rotation calculator 112 into corresponding frequency domain vectors $H_{XX}$, $H_{XY}$, $H_{YY}$ and $H_{YX}$ that can be supplied to the rotator 92 and applied to the intermediate arrays $\{T^A_X\}$ and $\{T^A_Y\}$, in the frequency domain, to yield the modified arrays $\{M^A_X\}$ and $\{M^A_Y\}$ 98.

An advantage of the embodiment of FIGS. 6 and 7 is that the modulation power of each of the detected X- and Y-polarization signals can be rotated to estimate the eigenvector excitation using polarization vectors $H_{XX}$, $H_{XY}$, $H_{YY}$ and $H_{YX}$ that have a width of as few as a single tap. This means that the eigenvector updater 94 can use far fewer gates than is necessary for the LMS update loop 86 of FIG. 4. For example, while the rotator 92 still implements an inverse jones matrix function, the multipliers in each signal path need only be configured to process a respective polarization vector having a width of a single tap. This is because the rotator 92 does not attempt to compensate PMD (as does the polarization compensator 60 of FIG. 4) but rather avoids the effects of PMD by discarding modulation energy on one of the two principal axes of the link.

Because the width of each polarization vector $H_{XX}$, $H_{XY}$, $H_{YY}$ and $H_{YX}$ is a single tap, the rotation angle θ can be calculated from much fewer samples that would otherwise be required. It is therefore possible to update the polarization vectors $H_{XX}$, $H_{XY}$, $H_{YY}$ and $H_{YX}$ at significantly higher rates than is possible using the LMS update loop 86 of FIG. 4, which inherently requires the vectors $H_{XX}$, $H_{XY}$, $H_{YY}$ and $H_{YX}$ to have a multiple-tap width in order to compensate PMD.

Figure 8:
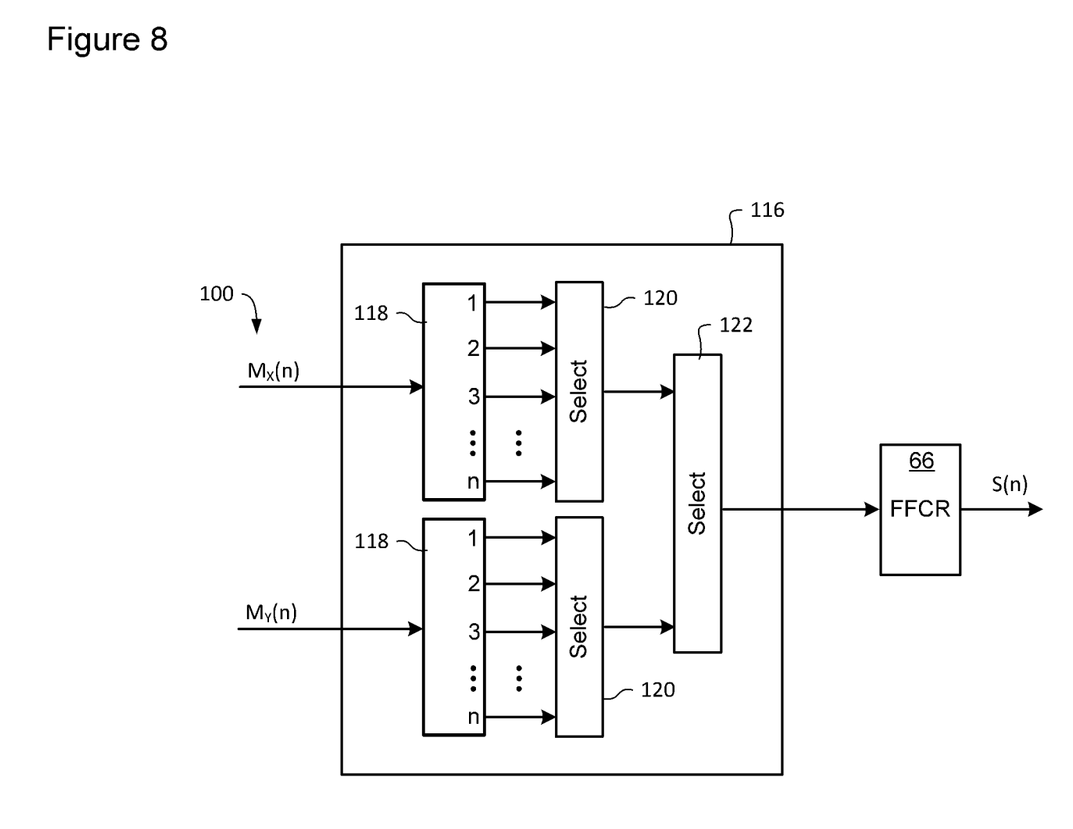
FIG. 8 is a block diagram schematically illustrating principal elements and operations of phase selector block in accordance with a second representative embodiment of the present technique.

As noted above, a signalling interval may be taken as the shortest period in which the transmitter 22 is capable of transmitting a polarized optical signal with a desired State of Polarization (SoP). In some embodiments, the signalling interval may correspond with a sample period of the D/A converters 28 in the transmitter 22. In some embodiments, a signalling interval may correspond with a symbol period. However, other alternative arrangements are possible. For example, the transmitter 22 may operate to transmit a given symbol in a symbol period that spans a plurality of signalling intervals, and using a different SoP in each interval. In this case, the selector 96 may be replaced by a phase selection block 116 that operates to select the best signalling interval to use for carrier recovery and data detection. FIG. 8 shows a representative phase selection block 116 that implements this operation.

For the illustrative example of FIG. 8, the transmitter 22 is assumed to modulate each symbol onto the optical carrier in a set of n consecutive timing intervals, using a respective different SoP in each of the n signal intervals. In this arrangement, each of the two sample streams $M_X(n)$ and $M_Y(n)$ output by the equalizer 90 is formatted in the same manner, and so contains modulation associated with each transmitted symbol distributed over a set of n timing intervals. The phase selection block 116 operates to select the best combination of signalling interval and eigenvector, and passes the corresponding samples to the carrier recovery block 66. Conceptually, this operation can be considered to be analogous to a phase detection function, in which the optimal signal phase is selected that maximizes the receiver eye-opening.

Accordingly, the phase selection block 116 of FIG. 8 comprises a respective distributer 118 that operates to distribute samples of each sample stream $M_X(n)$ and $M_Y(n)$ across a respective set of n parallel paths. In this case, each path is associated with a respective one of the n timing intervals over which a given symbol is transmitted, and receives a set of one or more samples 100 output from the equalizer 90 in that time interval. A respective first-stage selector 120 then operates to select a best one of the n paths (signaling intervals), based on any suitable criteria (such as Bit Error Rate or Signal to Noise Ratio, for example), and passes the samples of that time interval to a second stage selector 122. This results in the second stage selector 122 receiving samples from the best signalling interval selected from each of the two eigenvectors. The second stage selector 122 then compares these samples (again using any suitable criteria) to select the best eignvector, and then passes the associated samples to the carrier recovery block 66.

The arrangement of FIG. 8 is based on the implicit assumption that at least one of the n signalling intervals during which a given symbol is transmitted with a SoP that is close enough to the principal axes of the link birefringence to yield a satisfactory SNR in the receiver. The likelihood of this assumption being valid for a given symbol can be improved by selecting the SoP for each of the n signalling intervals such that the transmitted symbol is spread over at least a portion of the Poincare sphere. In the embodiment of FIG. 8, the second stage selector 122 performs an eigenvector selection function (similar to that of the selector 96 of FIG. 6), which means that the transmitted symbol only needs to be spread over half of the Poincare sphere. If the transmitted symbol is spread over the entire Poincare sphere, then the second stage selector 122 can be eliminated.

In the foregoing description, the phase selector 116 of FIG. 8 is described as being used in place of the selector 96 of FIG. 6. This implies that the equalizer 90, including the polarization rotator 92 and angle update block 94, may be used in conjunction with the phase selector 116. However, the principal operation of the rotator 92 is to translate the modulation of the detected X- and Y-polarizations to the link principal axes of PMD. In embodiments having a sufficiently large degree of oversampling (that is, each symbol is transmitted over a sufficiently large number n of signalling intervals), then it is likely that the transmitted SoP in at least one signalling interval is close enough to the principal axes of PMD that translation of the modulation from the detected X- and Y-polarizations to the link principal axes is not necessary. In such cases, the polarization rotator 92 and update loop 94 can be omitted.

In the foregoing embodiments, the transmitter is controlled to transmit an optical signal that is polarized in each signalling interval, with a SoP selected to excite both eigenvectors of the link PMD DGD. In the receiver, samples associated with one eigenvector are selected and used for data detection, whereas samples associated with the other eigenvector are a time delayed version of the samples associated with the selected eigenvector, and so may be are discarded. As described above, this arrangement has the benefit of avoiding differential group delay (DGD) due to Polarization Mode Dispersion (PMD), but at a cost of reduced spectral efficiency because the transmitter can only transmit a single polarized signal in any signalling interval. This means that a polarization interleaved signal may be used, but a polarization multiplexed signal cannot be used.

This limitation may be overcome by retaining both sample streams 100 output from the equalizer 90 (FIG. 6) and correcting the time delay, rather than discarding one of the sample streams. Timing control methods known, for example, from Applicant's U.S. Pat. No. 7,894,728, which issued to patent on Feb. 22, 2011, including the use of elastic stores may be used to at least partially compensate the DGD and thereby ensure at least coarse phase alignment between the two sample streams $M_X(n)$ and $M_Y(n)$. In this case, the two sample streams $M_X(n)$ and $M_Y(n)$ may be retained, and processed using inverse Jones matrix methods to recover the transmitted symbols. An advantage of this arrangement is that it allows the transmitter to be driven to transmit a polarization multiplexed signal, which therefor has improved spectral efficiency relative the embodiment of FIGS. 6-8.

The embodiments of the invention described herein are intended to be illustrative only. The scope of the invention is therefore intended to be limited solely by the scope of the appended claims.

I claim:

1. In a receiver of an optical communication system, a method comprising:
    detecting modulation of a received optical signal in two orthogonal polarization directions, the optical signal having been transmitted by a transmitter of the optical communication system with a predetermined State of Polarization (SoP) in a succession of signalling intervals, the SoP in each signalling interval exciting two orthogonal eigenvectors of Polarization Mode Dispersion (PMD) of the optical communication system; and
    recovering data from modulation components of a selected one of the two orthogonal eigenvectors, based on the detected modulation of the received optical signal.

2. The method as claimed in claim 1, wherein the SoP in a first signalling interval is different from the SoP in a second signalling interval.

3. The method as claimed in claim 1, wherein detecting modulation of the received optical signal comprises:
    a polarization beam splitter dividing the received optical signal into a pair of linearly polarized optical signals having a mutually orthogonal polarization orientations;
    a photodetector block detecting respective modulation of each one of the linearly polarized optical signals; and
    an Analog-to Digital converter block generating a respective polarization sample stream associated with each one of the linearly polarized optical signals, based on the modulation detected by the photodetector block.

4. The method as claimed in claim 1, wherein the signalling interval corresponds with a sample period of the transmitter.

5. The method as claimed in claim 1, wherein the signalling interval corresponds with a symbol period of the optical signal.

6. The method as claimed in claim 1, wherein a symbol period of the optical signal corresponds with a plurality of signalling intervals.

7. The method as claimed in claim 1, wherein selecting modulation components associated with one of the two orthogonal eigenvectors comprises discarding modulation components associated with the other one of the two orthogonal eigenvectors.

8. The method as claimed in claim 2, wherein the predetermined State of Polarization (SoP) is polarized in each signalling interval.

9. The method as claimed in claim 3, wherein recovering data from modulation components associated with the selected one of the two orthogonal eigenvectors comprises:
    rotating the polarization sample streams to generate respective modulation sample streams of each eigenvector; and
    selecting the respective modulation sample stream of one of the eigenvectors based on a predetermined criterion.

10. The method as claimed in claim 9, wherein the predetermined criterion comprises any one or more of a Bit Error Rate (BER) and a Signal to Noise Ratio (SNR).

11. The method as claimed in claim 9, wherein rotating the polarization sample streams comprises:
    estimating an angle between the two orthogonal polarization directions and the eigenvectors;
    calculating at least one rotation vector based on the estimated angle; and
    applying the at least one rotation vector to each polarization sample stream to generate the modulation sample streams of each eigenvector.

12. A receiver of an optical communication system, the receiver comprising:
    a detector configured to detect modulation of a received optical signal in two orthogonal polarization directions, the optical signal having been transmitted by a transmitter of the optical communication system with a predetermined State of Polarization (SoP) in a succession of signalling intervals, wherein the SoP in each signalling interval exciting two orthogonal eigenvectors of Polarization Mode Dispersion (PMD) of the optical communication system; and
    a processor configured to recover data from modulation components of a selected one of the two orthogonal eigenvectors, based on the detected modulation of the received optical signal.

13. The receiver as claimed in claim 12, wherein the SoP in a first signalling interval is different from the SoP in a second signalling interval.

14. The receiver as claimed in claim 12, wherein the detector comprises:
    a polarization beam splitter dividing the received optical signal into a pair of linearly polarized optical signals having a mutually orthogonal polarization orientations;
    a photodetector block detecting respective modulation of each one of the linearly polarized optical signals; and
    an Analog-to Digital converter block generating a respective polarization sample stream associated with each one of the linearly polarized optical signals, based on the respective modulation detected by the photodetector block.

15. The receiver as claimed in claim 12, wherein the predetermined State of Polarization (SoP) is polarized in each signalling interval.

16. The receiver as claimed in claim 12, wherein the signalling interval corresponds with a sample period of the transmitter.

17. The receiver as claimed in claim 12, wherein the signalling interval corresponds with a symbol period of the optical signal.

18. The receiver as claimed in claim 12, wherein a symbol period of the optical signal corresponds with a plurality of signalling intervals.

19. The receiver as claimed in claim 12, wherein the processor is further configured to discard modulation components of the other one of the two orthogonal eigenvectors.

20. The receiver as claimed in claim 14, wherein the processor comprises:
    a polarization rotator configured to rotate the polarization sample streams to generate respective modulation sample streams of each eigenvector; and
    a selector configured to select the respective modulation sample stream of one of the eigenvectors based on a predetermined criterion.

21. The receiver as claimed in claim 20, wherein the predetermined criterion comprises any one or more of a Bit Error Rate (BER) and a Signal to Noise Ratio (SNR).

22. The receiver as claimed in claim 20, further comprising an update block configured to:
    estimate an angle between the two orthogonal polarization directions and the eigenvectors; and calculate at least one rotation vector based on the estimated angle;

wherein the polarization rotator is configured to apply the at least one rotation vector to each polarization sample stream to generate the modulation sample streams of each eigenvector.

\* \* \* \* \*